United States Patent
Lee et al.

(10) Patent No.: US 10,521,918 B2
(45) Date of Patent: Dec. 31, 2019

(54) METHOD AND DEVICE FOR FILTERING TEXTURE, USING PATCH SHIFT

(71) Applicant: POSTECH ACADEMY-INDUSTRY FOUNDATION, Pohang-si (KR)

(72) Inventors: Seung Yong Lee, Pohang-si (KR); Hyun Joon Lee, Jecheon-si (KR); Hyung Woo Kang, Chesterfield, MO (US); Ho Jin Cho, Busan (KR)

(73) Assignee: POSTECH ACADEMY-INDUSTRY FOUNDATION, Pohang-si (KR)

( * ) Notice: Subject to any disclaimer, the term of this patent is extended or adjusted under 35 U.S.C. 154(b) by 0 days.

(21) Appl. No.: 15/543,564

(22) PCT Filed: Jan. 13, 2016

(86) PCT No.: PCT/KR2016/000332
§ 371 (c)(1),
(2) Date: Jul. 13, 2017

(87) PCT Pub. No.: WO2016/114574
PCT Pub. Date: Jul. 21, 2016

(65) Prior Publication Data
US 2018/0033156 A1    Feb. 1, 2018

(30) Foreign Application Priority Data
Jan. 14, 2015 (KR) .................. 10-2015-0006964

(51) Int. Cl.
*G06T 7/44*     (2017.01)
*G06T 5/20*     (2006.01)
(Continued)

(52) U.S. Cl.
CPC ............. *G06T 7/44* (2017.01); *G06T 5/002* (2013.01); *G06T 5/20* (2013.01); *G06T 7/33* (2017.01); *G06T 11/001* (2013.01); *H04N 1/409* (2013.01)

(58) Field of Classification Search
None
See application file for complete search history.

(56) References Cited

U.S. PATENT DOCUMENTS

| 2008/0074435 A1 | 3/2008 | Sekine |
| 2012/0308153 A1 | 12/2012 | Hwang |

(Continued)

FOREIGN PATENT DOCUMENTS

| KR | 2010-0077307 A | 7/2010 |
| KR | 2012-0103878 A | 9/2012 |
| KR | 2012-0134615 A | 12/2012 |

OTHER PUBLICATIONS

Cho, Hojin et al., "Bilateral Texture Filtering", ACM Transations on Graphics—Proceedings of ACM SIGGRAPH 2014, vol. 33, Issue 4, Jul. 2014, Article 128, 8 pages.

*Primary Examiner* — Frank S Chen
(74) *Attorney, Agent, or Firm* — Morgan, Lewis & Bockius LLP

(57) ABSTRACT

Disclosed is a method and device for filtering texture, using a patch shift. A patch-based texture filtering method for removing texture from an image comprises the steps of: distinguishing a structure edge from patches for each pixel of an input image; and performing a patch shift for the patches of each pixel, on the basis of structure edge information of each of the patches to select a representative patch of each pixel. Accordingly, the method can generate a result image in which texture has been automatically and completely removed from a piece of the input image.

18 Claims, 4 Drawing Sheets

(51) Int. Cl.
*G06T 7/33* (2017.01)
*G06T 5/00* (2006.01)
*G06T 11/00* (2006.01)
*H04N 1/409* (2006.01)

(56) References Cited

U.S. PATENT DOCUMENTS

| | | |
|---|---|---|
| 2014/0177941 A1 | 6/2014 | Docherty et al. |
| 2014/0212033 A1* | 7/2014 | Liang .................... H04N 1/642 |
| | | 382/166 |
| 2015/0154743 A1 | 6/2015 | Ioffe et al. |
| 2016/0086316 A1* | 3/2016 | Lee ........................ G06T 5/002 |
| | | 382/167 |

* cited by examiner

METHOD AND DEVICE FOR FILTERING TEXTURE, USING PATCH SHIFT

TECHNICAL FIELD

The present disclosure relates to a technique for generating an image by automatically removing texture from a two-dimensional image, and more particularly to a texture filtering method for removing texture by using a patch shifting without affecting structural edges of an original image and an apparatus for the same.

BACKGROUND ART

Image texture removal is a kind of image processing technique that allows representing an overall shape of an object more clearly by removing a texture while preserving structural edges of an original image. Various studies on such the image texture removal techniques have been carried out, and the most common approach is to blend pixels such that they do not cross edge boundaries in consideration of the structural edges when smoothing the image.

Various methods have been proposed so far in relation to smoothing techniques that can preserve edges. One of the most widely used methods is a method using a bilateral filtering. The bilateral filtering is a filtering technique that does not blend areas with large color differences, and has been widely used for various applications due to its simplicity, effectiveness, and scalability.

In addition to the bilateral filtering, various methods for the image texture removal for preserving structural edges have been developed, including methods using weighted least squares, edge-avoiding wavelets, local histogram filtering, Laplacian pyramids, domain transformation, optimization for minimizing L0 gradients, and the like. Such the image texture removal methods have been proposed for the purpose of preserving the structural edges of an original image and smoothing fine-details of the original image, but since they do not process texture explicitly, there is a limit to be used for explicit texture removal.

As another edge-preserving smoothing method, there is a method of using local extrema to separate the fine-details of the image from a base layer of the image. Alternatively, regular or nearly regular textures can be found using spatial relationships, frequency, and symmetry of texture features. Also, total variation (TV) regularization is effective for removing irregularly-shaped textures, and is suitable for filtering to preserve large-scale edges. The TV regularization has been further extended to improve quality, robustness, and efficiency. Specifically, relative TV is a spatially varying TV measure of the image to improve quality when separating textures and image structure.

Recently, a patch-based texture removal method in which similarity of image patches is measured based on region covariance descriptors has been proposed. As compared to typical pixel-based image decomposition methods, the patch-based method uses a covariance matrix between each patch and neighboring patches so that more accurate detection of texture features becomes possible and the performance of separating textures from the structural edges can be enhanced. However, the patch-based method has a problem that the patches at the edge boundaries are overlapped to have similar statistical characteristics and thus the structural edges are smudged.

The proposed methods have the limitation that they are difficult to implement, accelerate, scale, and adapt their algorithms due to the computational complexity of them despite effective smoothing. Also, since the conventional image texture removal techniques mainly focus on the smoothing technique that preserves the edges, there is a limitation that the textures are not explicitly processed and the textures cannot be clearly removed. Also, in the case of the patch-based texture removal method that explicitly processes textures, there is a limit in that acceleration, expansion, and adaptation of its algorithm are also difficult due to computational complexity needed for image optimization and regularization calculation.

DISCLOSURE

Technical Problem

The purpose of the present invention for resolving the above-described problem is to provide a texture filtering method and an apparatus based on patch shifting, which select patches representing respective pixels in an image so as not to include structural edges in order to preserve the structural edges during an image filtering process performed in units of patches.

Technical Solution

In order to achieve the above-described purpose, an aspect of the present disclosure may provide a patch-based texture filtering method for removing texture from an image, comprising determining a structural edge in respective patches for respective pixels of an input image; and performing patch shifting of the respective patches for respective pixels based on structural edge information of the respective patches, and selecting representative patches for the respective pixels.

Here, in the determining a structural edge, the structural edge may be determined based on a tonal range or modified relative total variation (mRTV) of pixel values of the respective patches for respective pixels.

Here, in the selecting representative patches, a neighboring patch or a reference patch having a minimum tonal range or a minimum mRTV may be selected as a representative patch.

Here, the texture filtering method may further comprise, after the selecting representative patches, generating a first guide image by using information on the representative patches and the input image.

Here, the texture filtering method may further comprise, before the generating the first guide image, smoothing the input image.

Here, the texture filtering method may further comprise, after the generating the first guide image, generating a second guide image by using the first guide image and a smoothed input image.

Here, the texture filtering method may further comprise performing joint bilateral filtering by using the second guide image and the input image.

Here, the generating a second guide image includes generating the second guide image by adding a value obtained by multiplying pixel values of the first guide image and a degree of blending and a value obtained by multiplying pixel values of the smoothed input image and one's complement value of the degree of blending. Here, the degree of blending may be defined based on the mRTV determined in the determining a structural edge in respective patches and the mRTV of the representative patches selected in the selecting representative patches.

Here, the texture filtering method may further comprise repeatedly performing texture filtering by using a result image obtained through the joint bilateral filtering as a new input image.

In order to achieve the above-described purpose, another aspect of the present disclosure may provide a computer-readable recording medium storing a computer program for performing one of texture filtering methods according to the above-described embodiments.

In order to achieve the above-described purpose, yet another aspect of the present disclosure may provide a patch-based texture filtering apparatus for removing texture from an image comprising a determination unit determining a structural edge in respective patches for respective pixels of an input image; and a selection unit performing patch shifting of the respective patches for respective pixels based on structural edge information of the respective patches, and selecting representative patches for the respective pixels.

Here, the determination unit may determine whether the respective patches for respective pixels of the input image include a structural edge based on a tonal range or modified relative total variation (mRTV) of pixel values of the respective patches for respective pixels.

Here, the selection unit may select a neighboring patch or a reference patch having a minimum tonal range or minimum mRTV as a representative patch for each pixel. Here, when the reference patch is a patch in which a first pixel is disposed in a center thereof, the neighboring patch may include one of patches obtained by shifting the reference patch so that the first pixel is disposed around the center thereof. When the reference patch is a patch in which the first pixel is disposed in a predetermined first position thereof, the neighboring patch may include one of patches obtained by shifting the reference patch so that the first pixel is disposed in a second position different from the predetermined first position.

Here, the texture filtering apparatus may further comprise a first generation unit generating a first guide image by using information on the representative patches and the input image; and a second generation unit generating a second guide image by using the first guide image and the input image. The first generation unit and the second generation unit may be included in a generation unit generating a guide image.

Here, the texture filtering apparatus may further comprise a smoothing unit smoothing the input image before the first generation unit generates the first guide image.

Here, the texture filtering apparatus may further comprise a joint bilateral filtering unit performing joint bilateral filtering by using the second guide image and the input image.

Here, the texture filtering apparatus may further comprise a feedback unit performing texture filtering repeatedly by using a result image obtained through the joint bilateral filtering as a new input image.

Advantageous Effects

Using the above-described texture filtering method or apparatus based on patch shifting according to the present disclosure, textures can be automatically removed from a two-dimensional image so that a result image in which the texture is removed can be obtained. That is, it is made possible to preserve structural edges as compared to conventional texture removal methods, thereby solving the existing problem of not clearing textures by not explicitly processing textures, and generating a result image in which texture is completely removed. The result image in which texture is completely removed is meaningful not only because it contains only the structural edges that are significant for image recognition but also because it can be used for a preprocessing technique to enhance various image processing and computer vision technology.

The texture filtering method or apparatus based on patch shifting according to the present disclosure is characterized in that in the image filtering process performed in units of patches, neighboring patches which do not include a structural edge among neighboring patches for respective pixels are selected as representative patches for the respective pixels, so that the structural edges are not crushed.

Also, when the texture filtering method or apparatus based on patch shifting according to the present disclosure is used, the texture can be effectively removed even with a small calculation cost owing to the simplicity of the patch shifting. That is, according to the present disclosure, it is made possible to effectively remove arbitrary textures from the input image without affecting the structural edge of the two-dimensional input image, and to have excellent scalability and adaptability. Also, it is made simple and easy to implement.

BEST MODE

Figure 1:
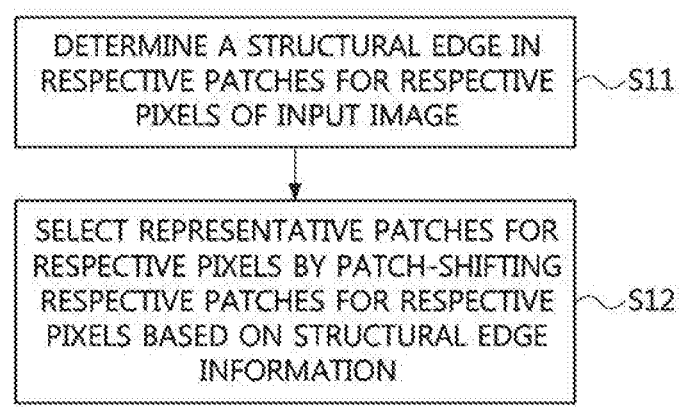
FIG. 1 is a flow chart for explaining a texture filtering method according to an embodiment of the present disclosure.

While the invention is susceptible to various modifications and alternative forms, specific embodiments thereof are shown by way of examples in the drawings and will herein be described in detail. It should be understood, however, that there is no intent to limit the invention to the particular forms disclosed, but on the contrary, the invention is meant to cover all modifications, equivalents, and alternatives falling within the spirit and scope of the invention. Like numbers refer to like elements in the accompanying drawings.

It will be understood that, although the terms first, second, A, B, etc. may be used herein to describe various elements, these elements should not be limited by these terms. These terms are only used to distinguish one element from another. For example, a first element could be termed a second element, and, similarly, a second element could be termed a first element, without departing from the scope of the inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, it will be understood that when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred embodiments according to the present disclosure will be described in detail with reference to the accompanying drawings. In order to facilitate the understanding of the present disclosure, the same reference numerals are used for the same constituent elements in the drawings and redundant explanations for the same constituent elements are omitted. In the following description of the present disclosure, a detailed description of known functions and configurations incorporated herein will be omitted when it may make the subject matter of the present disclosure rather unclear.

FIG. 1 is a flow chart for explaining a texture filtering method according to an embodiment of the present disclosure.

Referring to FIG. 1, a texture filtering method according to the present embodiment, as a patch-based image filtering method for removing texture of an image, may comprise a step S11 of determining structural edges (hereinafter referred to as a structural edge determination step), and a step S12 of selecting representative patches for respective pixels (hereinafter referred to as a representative patch selection step).

In the structural edge determination step S11, a determination unit of an apparatus performing the texture filtering method may determine structural edges from patches for respective pixels of an input image. In an embodiment, the structural edge determination step S11 may determine whether at least one structural edge exists in each patch based on a tonal range or a modified relative total variation (mRTV) of pixel values in respective patches for respective pixels in the input image.

In the structural edge determination step S11, the case of determining the structural edges based on the tonal range will be described as follows.

That is, with respect to each patch $\Omega_p$ centered on each pixel p of the input image I, a tonal range of pixels included in the patch $\Omega_p$ may be defined as represented in Equation 1 by including the maximum brightness value $I_{max}(\Omega_p)$ and the minimum brightness value $I_{min}(\Omega_p)$ of the pixel values included in the patch $\Omega_p$.

$$\Delta(\Omega_p) = I_{max}(\Omega_p) - I_{min}(\Omega_p) \quad \text{[Equation 1]}$$

Also, in the structural edge determination step S11, a modified relative total variation (mRTV) of the pixel values in each patch (reference patch) may be defined as represented in Equation 2 by including the tonal range of Equation 1 and a gradient size $|(\partial I)_r|$ of respective pixels in the patch.

$$mRTV(\Omega_p) = \Delta(\Omega_p) \cdot \frac{\max_{r \in \Omega_p} |(\partial I)_r|}{\sum_{r \in \Omega_p} |(\partial I)_r| + \epsilon} \quad \text{[Equation 2]}$$

In the representative patch selection step S12, a selection unit of the apparatus for performing the texture filtering method may select representative patches by patch-shifting the patches for respective pixels, on the basis of the structural edges, the tonal range, and the mRTV from the determination unit.

For example, in the representative patch selection step S12, the representative patches may be selected by comparing k×k patches including the pixel p with respect to k×k pixels belonging to the patch $\Omega_p$ centered on the pixel p of the input image. That is, in the representative patch selection step S12 of the present embodiment, when selecting the representative patch among the neighboring k×k patches including the pixel p, the patch (reference patch or one of neighboring patches) having the smallest tonal range or mRTV determined in the step S11 may be selected as the representative patch.

Among patches based on a specific pixel (hereinafter referred to as a 'first pixel'), a patch in which the specific pixel (i.e., the first pixel) is disposed in the center of the patch is referred to as a 'reference patch'. Also, the neighboring patches may be obtained by shifting or translating the reference patch so that the first pixel is disposed around their respective centers.

Also, when a patch in which the pixel is disposed in a first position which is not the center of the patch is considered to be the reference patch, the neighboring patches may be obtained by shifting or translating the reference patch so that the first pixel is disposed in a second position different from the first position.

Also, the above-described representative patch selection step S12 may include a step in which the reference patch is selected as the representative patch when one or more neighboring patches having the minimum tonal range or the minimum mRTV exist together with the reference patch (that is, when a plurality of patches having the minimum tonal range or the minimum mRTV exist as including the reference patch). According to such the configuration, in case that a structural edge is present at a boundary of a patch or not included in the patch in a default patch shape, a predetermined patch shape may be directly selected for respective pixels (including the first pixel) so that patch shifting operations for cases that patch shifting is not required can be reduced for efficiency of the apparatus.

According to the present embodiment, there is an advantage that an image having only structural edges can be provided by effectively and precisely removing textures from a two-dimensional image in the patch-based texture filtering process or the image filtering process.

FIGS. 2A to 2D are conceptual diagrams for explaining patch shapes which can be applied to the texture filtering method of FIG. 1, and a patch-based image filtering method.

Referring to FIGS. 2A to 2D, in the texture filtering method according to the present disclosure, a 3×3 patch 3 having three pixels in the horizontal direction and three pixels in the vertical direction may be used for a two-dimensional (2D) input image 2. Here, the patch may be an image portion including a plurality of pixels among all pixels of the input image 2, and may be used for filtering such as smoothing and texture removal of the input image 2. Also, the patch may be configured to have a predetermined shape on the basis of a specific pixel or reference pixel (e.g., c1, c2, or c5).

In the present embodiment, a patch size for the patch-based image filtering or texture filtering is described in the form of a 3×3 patch, but not limited thereto, and a k×k patch having k pixels horizontally and k pixels vertically may also be used. For example, a 5×5 patch 5 having 5 pixels in the horizontal direction and 5 pixels in the vertical direction may be used. Also, depending on the implementation, a n×m patch with n pixels in the horizontal direction and m pixels in the vertical direction may be used. Here, n and m are different natural numbers.

Also, in the present embodiment, the shape of the patch is defined as the position of the reference pixel at the center of the patch, but the present disclosure is not limited thereto. The reference pixel may be located at one side edge or between the center and the edge of the patch (refer to the patch P5s shown in FIG. 2D.

A process of performing texture filtering using the 3×3 patch 3 will be described as an example.

First, an apparatus for performing a texture filtering method (hereinafter, simply referred to as a 'texture filtering apparatus') may perform filtering on the input image 2 based on patches for respective pixels of the input image 2.

Figure 2A:
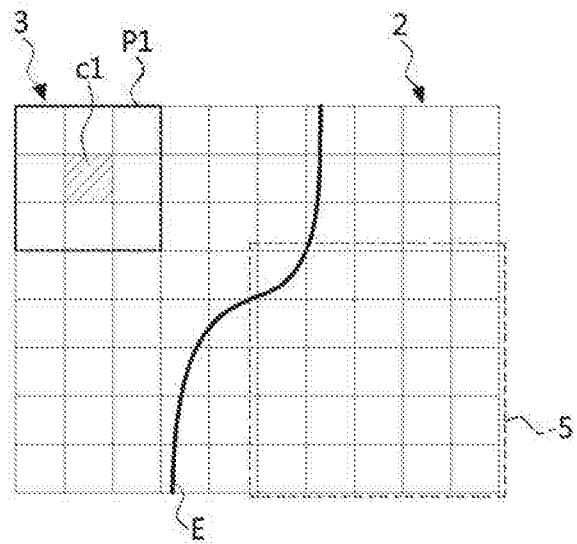
FIGS. 2A to 2D are conceptual diagrams for explaining patch shapes which can be applied to the texture filtering method of FIG. 1, and a patch-based image filtering method.

That is, as shown in FIG. 2A, the texture filtering apparatus may determine whether a structural edge (e.g., a structural edge E) exists in the first patch P1 for the first pixel c1, and if no structural edge exists in the first patch P1, the texture filtering apparatus may perform filtering on the first patch P1 and move to the next pixel.

Figure 2B:
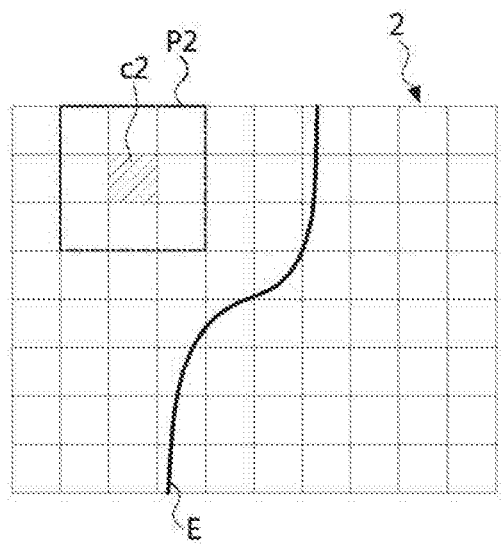

Similarly to the case of the first patch P1, the texture filtering apparatus may determine whether a structural edge (e.g., the structural edge E) exists in the second patch P2 for the second pixel c2 as shown in FIG. 2B. Since there is no structural edge in the second patch P2, the texture filtering apparatus may perform filtering on the second patch P2 and move to the next pixel in a predetermined order.

Figure 2C:
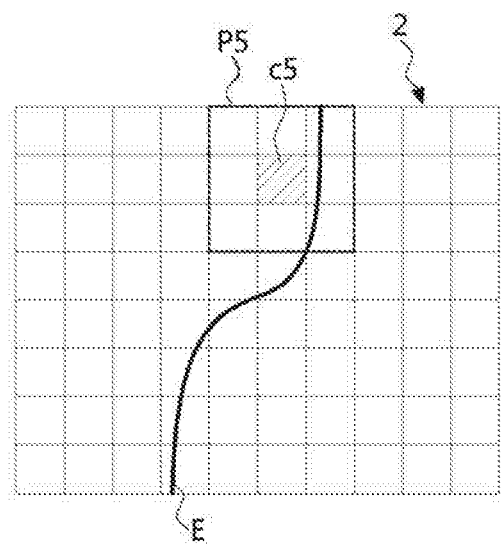

Then, the texture filtering apparatus may determine whether a structural edge exists in a fifth patch P5 for a fifth pixel c5 of the input image 2, as shown in FIG. 2C. In this case, since the structural edge E exists in the fifth patch P5, the fifth patch P5 may be shifted.

Figure 2D:
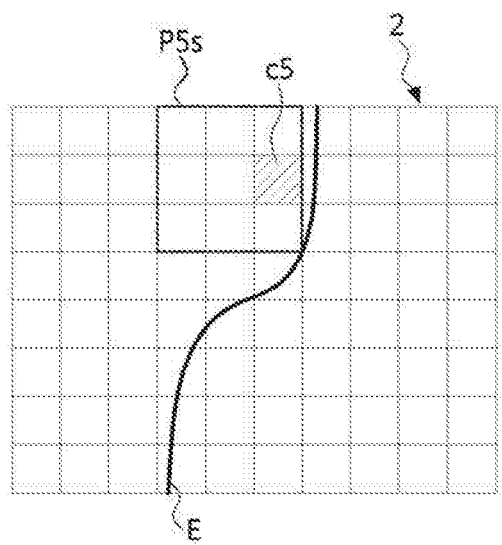

That is, as shown in FIG. 2D, the texture filtering apparatus may shift the fifth patch P5, which is a reference patch for the fifth pixel c5, in which the fifth pixel c5 is located at the center thereof, into a shifted fifth patch P5s which is one of the neighboring patches of the fifth patch P5. In the shifted fifth patch P5s, the fifth pixel c5 is located at one edge of the patch.

In the above-described patch shifting, the texture filtering apparatus may determine whether a structural edge exists in reference patches for respective pixels. In the case that a reference patch for a pixel has a structural edge therein, the texture filtering apparatus may measure tonal ranges or mRTVs for the reference patch and all neighboring patches to which the reference patch can be shifted, compare the measure values with each other, and select a patch having the minimum values as a representative patch.

According to the above-described configuration, the representative patches for respective pixels may be selectively selected using the patch shifting, thereby effectively removing textures of the input image without affecting the structural edges.

Meanwhile, although it is described that the filtering is performed on each patch in the above-described embodiment, the present disclosure is not limited to such the configuration. It may be also possible to store pixel values of respective patches for all the pixels of one or more rows/columns or the entire input image, and then collectively perform filtering. This can be selectively applied depending on data processing speed or memory capacity of the texture filtering apparatus, the type of the display screen of an application program using the filtering, and the like.

Figure 3:
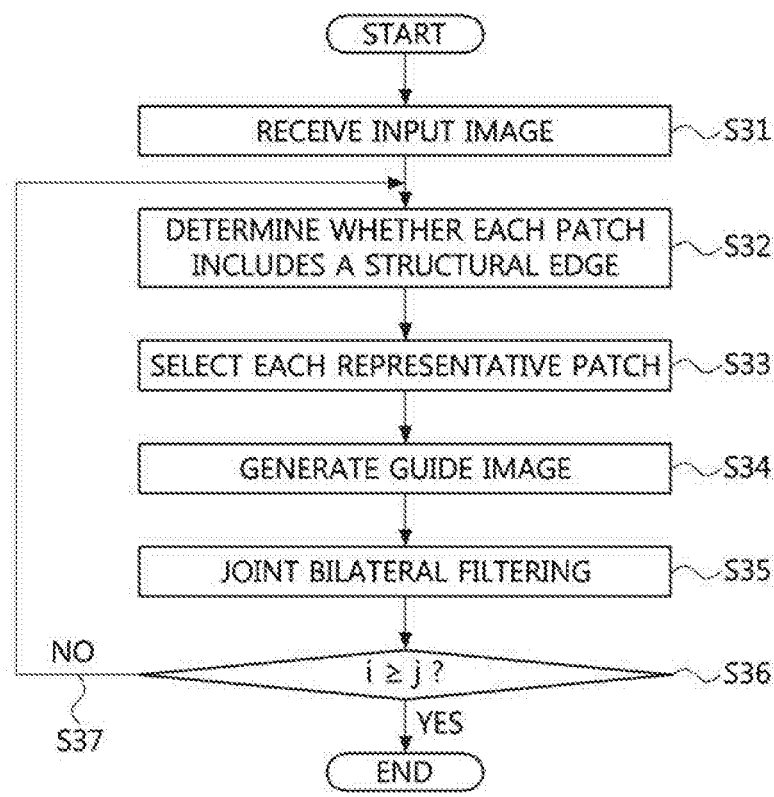
FIG. 3 is a flow chart for explaining a texture filtering method according to another embodiment of the present disclosure.

FIG. 3 is a flow chart for explaining a texture filtering method according to another embodiment of the present disclosure.

Referring to FIG. 3, a texture filtering method according to the present embodiment may comprise a step S31 of receiving an input image, a step S32 of determining whether each patch includes a structural edge, a step S33 of selecting a representative patch, a step S34 of generating a guide image, and a step S35 of joint bilateral filtering.

Each of the steps will be described in more detail. First, in the step S31 of receiving an input image, the texture filtering apparatus may receive a 2D image obtained by various methods. For example, in the step S31, the texture filtering apparatus may receive a camera image or an image stored on a disk. The 2D input image may be a plane image and have orthogonal coordinate axes of x axis and y axis. The 2D input image may be a mosaic image including structural edges.

Then, in the step S32 of determining whether each patch includes a structural edge (hereinafter, simply referred to as a 'structural edge determination step), the texture filtering apparatus may determine whether respective patches for respective pixels of the input image received in the step S31 or the step S35 include a structural edge. That is, in the step S32, it may be determined whether or not each patch including a part of pixels constituting the input image includes a structural edge.

In order to determine whether or not a patch includes a structural edge in the step S32, a tonal range or a mRTV of pixel values within the patch may be calculated and used for the determination.

Then, in the step S33, the texture filtering apparatus may perform a patch shifting of a patch for a specific pixel including a structural edge, and select a patch having the minimum tonal range or minimum mRTV among a plurality of patches shifted from the patch as a representative patch for the specific pixel. When a plurality of patches having the minimum tonal range or minimum mRTV exist, the texture filtering apparatus may select a reference patch included in the plurality of patches having the minimum tonal range or minimum mRTV or an arbitrary patch among them when the reference patch is not included in them.

Then, in the step S34, the image received in the step S31 or the step S35 may be subjected to image smoothing to obtain a smoothed image. Then, the texture filtering apparatus or the image filtering apparatus may generate an initial guide image by substituting respective pixels of the smoothed image with respective smoothed pixels of the representative patch selected in the step S33. Also, the texture filtering apparatus or the image filtering apparatus may acquire a guide image (second guide image) by blending the initial guide image and the input image. In this case, the input image may be an image which is smoothed or an image which is not smoothed.

The initial guide image may be generated by substituting respective pixels of the smoothed image B with the respective smoothed pixels of the representative patches.

Also, the generation of the guide image $G_p$ may be defined as represented Equation 3 by including the pixel values $B_p$ of the smoothed image, the pixel values of $G_p^0$, and the degree of blending $\alpha_p$.

$$G_p = \alpha_p G_p^0 + (1-\alpha_p)B_p \quad \text{[Equation 3]}$$

Here, the degree of blending $\alpha_p$ may be defined as represented in Equation 4 by including mRTV($\Omega_p$) determined in the step S32 and mRTV($\Omega_q$) for the representative patch determined in the step S33.

$$\alpha_p = 2\left[\frac{1}{1+\exp\{-\sigma_\alpha(mRTV(\Omega_p)-mRTV(\Omega_q))\}} - 0.5\right] \quad \text{[Equation 4]}$$

In Equation 4, the degree of blending $\alpha_p$ may correspond to the mRTV.

Also, in the present embodiment, the mRTVs of the respective patches in Equation 4 may be substituted with the tonal range of Equation 1.

Then, in the step S35, the texture filtering apparatus may acquire a result image by applying a joint bilateral filter using the guide image generated in the step S34. In the step S35, the texture filtering apparatus may perform joint bilateral filtering using the guide image and the input image to obtain the result image.

The joint bilateral filtering may be performed using a method disclosed by Eisemann et al. in a thesis '*Flash photography enhancement via intrinsic relighting*' published on Mar. 3, 2004 in ACM transactions on Graphics. However, the present disclosure is not limited thereto.

In the present embodiment, the inputs of the joint bidirectional filtering are the input image to which the filtering is applied and the guide image to which the patch shift is applied to the input image. Unlike conventional bilateral filtering which calculates bi-directional weights from an input image, in the joint bilateral filtering of the present embodiment, bi-directional weights may be calculated from the guide image to which patch shifts are applied, and the calculated weights may be used to filter the input image.

Also, the above-described texture filtering method may perform the above-described steps (S32 through S35) repeatedly using the result image from the joint bilateral filtering as an input image according to the implementation to obtain a desired result image (S36, S37). The repetition of the steps S32 to S35 may be performed by the repetition number i that is smaller than a predetermined repetition number j or according to a user setting or a user input that replaces a preset number of times.

According to the present embodiment, in order to preserve the structural edge in the image filtering process performed in units of patches, the image filtering apparatus or the texture filtering apparatus may perform patch shifts for selecting a representative patch for each pixel so that the representative patch does not include a structural edge, and thus a result image in which textures are effectively removed through the texture filtering.

Figure 4:
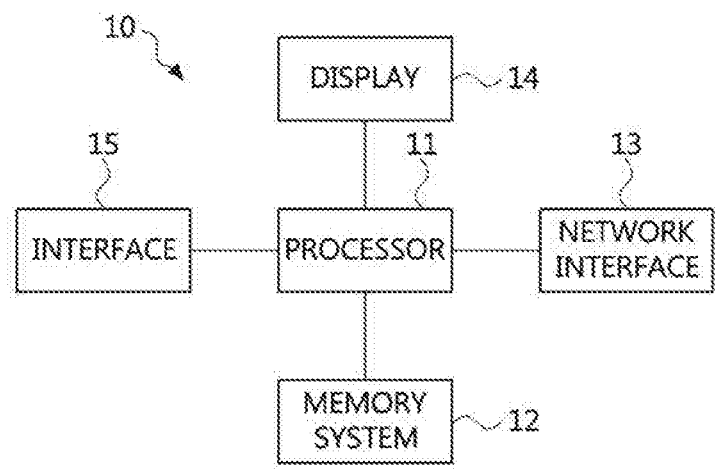
FIG. 4 is a block diagram illustrating a texture filtering apparatus according to another embodiment of the present disclosure.

FIG. 4 is a block diagram illustrating a texture filtering apparatus according to another embodiment of the present disclosure.

Referring to FIG. 4, a texture filtering apparatus 10 according to the present embodiment may comprise a processor 11 and a memory system 12. Also, depending on the implementation, the texture filtering apparatus 10 may further comprise a network interface 13, a display device 14 (hereinafter, simply referred to as 'display'), and an interface 15.

The processor 11 may be configured to determine structural edges in patches for respective pixels of an input image, and select representative patches for the respective pixels based on information on the structural edges for the patches by performing patch shifting of the patches. Here, the processor 11 may select the respective representative patches for the respective pixels based on the tonal ranges and mRTVs of the pixel values of the respective patches.

Also, the processor 11 may generate the guide image, and perform a joint bilateral filtering on the generated guide image and the input image. Here, in the generating the guide image, the processor 11 may make the input image be smoothed, generate an initial guide image (i.e., a first guide image) based on the smoothed input image and information on the representative patches for the respective pixels in the input image, and generate a second guide image by using the first guide image and the input image.

Further, the processor 11 may operate to repeat the above-described texture filtering process using a result image of the joint bilateral filtering as a new input image.

The processor 11 described above may be connected to the memory 12 to execute a program code stored in the memory 12. The program code may be one for performing the texture filtering method using patch shift according to the present embodiment or an image filtering method including the same.

The memory system 12 may include a main memory in the form of a short-term storage medium such as a Random Access Memory (RAM) and a Read Only Memory (ROM), and an auxiliary memory in the form of a long-term storage medium such as a floppy disk, a hard disk, a tape, a compact disc (CD) ROM, etc.

The network interface 13 may be connected to a network and may perform data communications with other communication devices on the network. Using the network interface 13, the texture filtering apparatus using patch shift according to the present embodiment may download or receive data or signals used for the steps of the texture filtering method in order to perform the texture filtering operation. The network interface 13 described above may be implemented to support one or more communication protocols for performing data communications in one or more single or combination networks selected from a wireless network, a wired network, a satellite network, a power line communication, and the like.

The display 14 may connected to the processor 11 and refer to a component for displaying the texture filtering process or the result image of the texture filtering process on a screen or a component for performing a function corresponding to this means. The display device 14 may be directly connected to the processor 11 but is not limited thereto and may be remotely connected to the processor 11 via the network interface 13. The display device 14 may be a liquid crystal display (LCD) device, an organic light emitting diode (OLED) display device, a plasma display panel (PDP) display device, or a cathode ray tube (CRT) display device.

The interface 15 may be connected to the processor 11 and may include a device for communicating between the texture filtering apparatus 10 and an external device (including an external user) or a device that performs a function corresponding to this device. The interface 15 may include at least one or more input devices selected from a keyboard, a mouse, a touch screen, a touch panel, a microphone, etc., and may include at least one output device selected from a speaker, a lighting means, etc.

Figure 5:
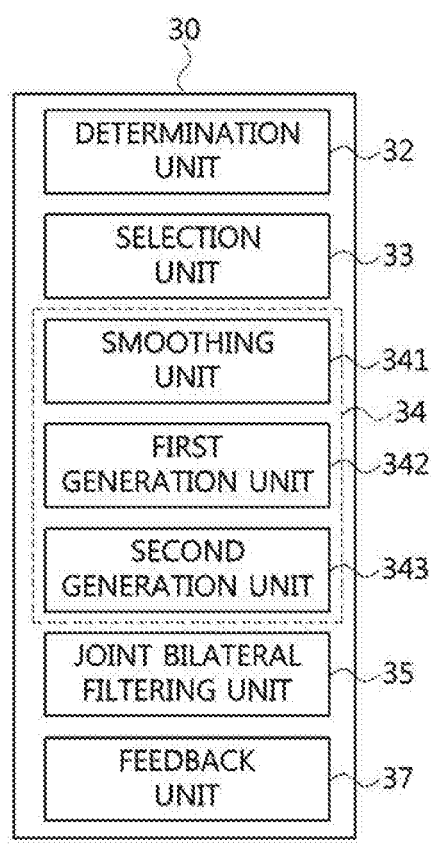
FIG. 5 is a block diagram illustrating a texture filtering apparatus according to yet another embodiment of the present disclosure.

FIG. 5 is a block diagram illustrating a texture filtering apparatus according to yet another embodiment of the present disclosure.

Referring to FIG. 5, the texture filtering apparatus 30 according to the present embodiment may comprise a determination unit 32 and a selection unit 33. The texture filtering apparatus 30 may further comprise a generation unit 34 and a joint bidirectional filtering unit 35. Also, the texture filtering apparatus 30 may further comprise a feedback unit 37 in accordance with another implementation. Here, the generation unit 34 may comprise a smoothing unit 341, a first generation unit 342, and a second generation unit 343. Here, the above-described units may be implemented as program (software) modules stored in the memory 12 and executed by the processor 11.

The above-described components of the texture filtering apparatus according to the present embodiment will be briefly described based on the above-described texture filtering method (see FIG. 1 or FIG. 3). The determination unit 32 may perform the step of determining structural edges, the selection unit 33 may perform the step of selecting representative patches, the generation unit 34 may perform the step of generating the guide image (second guide image), the joint bilateral filtering unit 35 may perform the step of joint bilateral filtering, and the feedback unit 37 may be implemented as a means for performing an iterative step or a component for performing a function corresponding to this means.

In more detail, the determination unit 32 may measure the tonal range of pixel values within the patches constituting the input image. A patch is a piece of the input image. The determination unit 32 may also measure mRTV values with respect to the pixel values inside the patches.

Also, the determination unit 32 may determine whether or not a structural edge is included in each patch based on the measured tonal range and the mRTV values. That is, in order to determine whether or not a structural edge is included in each patch of the input image, the determination unit 32 may determine the presence or absence of a structural edge for each patch by measuring pixel values in the patch, or measuring the tonal range or mRTV value for pixels in the patch. Explanation on the method of measuring the tonal range and the mRTV is replaced with the explanation with reference to Equation 1 and Equation 2.

The selection unit 33 may select a representative patch for each pixel with reference to whether or not a structural edge is included in each patch. For example, the selection unit 33 may select a patch having the minimum tonal range and the minimum mRTV measured by the determination unit 32 as a representative patch.

Also, when selecting a representative patch using the presence or absence of a structural edge in each patch, the selection unit 33 may calculate the number of structural edges included in a plurality of patches (including a reference patch and neighboring patches) for a reference patch for a specific pixel (reference pixel or first pixel), and select a patch having the smallest number of structural edges among the plurality of patches as the representative patch for the specific pixel. Here, the plurality of patches may include the reference patch in which the reference pixel is located at a predetermined position, and neighboring patches that have the same size as the reference patch but are shifted to include other pixels not included in the reference patch.

The generation unit 34 may generate a guide image using the smoothed input image and the representative patches. The smoothed input image refers to the input image smoothed through the smoothing unit 341. For example, the generation unit 34 may generate a guide image (second guide image) based on the smoothed input image, the representative patches, and a generated initial guide image (first guide image).

The generation unit 34 may include an smoothing unit 341 for initial filtering of the input image. The smoothing unit 341 refers to a unit that outputs an smoothed image by performing image smoothing on the input image or a result image obtained from the joint bilateral filtering unit 35.

The generation unit 34 may include the first generation unit 342 for generating the initial guide image by substituting the respective pixels of the smoothed input image with the smoothed pixel values of the representative patches selected by the selection unit 200. Also, the generation unit 34 may include the second generation unit 343 for generating the guide image by blending the initial guide image with the input image.

The guide image generated by the above-described generation unit 34 may be defined by Equation 3.

The joint bilateral filtering unit 35 may perform joint bilateral filtering using the guide image and the input image, and obtain the result image. The input image may be a smoothed image or a non-smoothed image.

In the present embodiment, the joint bilateral filtering unit 35 may receive two inputs: the input image to which filtering is applied and the guide image obtained by applying a patch shift to the input image. Unlike conventional bilateral filtering, which calculates bilateral weights from an input images (including NO FLASH image and FLASH image), in the joint bilateral filtering of the present embodiment, bilateral weights may be calculated from the guide image to which the patch sheet is applied and the input image, and the calculated weights may be used to filter the input image to output a final result image having substantially the structural edges only.

The feedback unit 37 may refer to a means or a component for repeatedly performing the texture filtering using the result image of the joint bilateral filtering unit 35 as an input image. The feedback unit 37 may include a comparison unit (see S36 in FIG. 3) and a feedback path (see S37 of FIG. 3) in order to repeatedly perform texture filtering in an inner loop form when the number of repetitions i is smaller than a preset reference number j. Here, the preset reference number j may correspond to a user-setting value or a real-time user input value.

According to the present embodiment, textures may be precisely removed from a 2D input image through repetitive texture filtering in which a guide image to which representative patches selected based on patch shifting are applied and an input image are joint-bilaterally filtered and a result image of the joint bilateral filtering is used as a new input image, thereby outputting a final result image having substantially the structural edges only.

In the embodiments of the present disclosure, each of the above-described components (including the units 32 to 35) may be a module executed on a processor or a functional unit of a portable terminal or a computer apparatus, but is not limited thereto. The above-described components may be embodied in the form of a computer-readable medium (recording medium) for storing a program that can be executed in various computer devices. In this case, the computer-readable medium may include a plurality of computer devices or a cloud system connected via a network, and at least one of the plurality of computer devices or the cloud system may store a program code for performing a texture filtering method according to the present disclosure.

The computer-readable medium may include a program instruction, a data file, a data structure, or a combination thereof. The program instructions recorded on the computer-readable medium may be designed and configured specifically for the present disclosure or can be publicly known and available to those who are skilled in the field of computer software.

Examples of the computer-readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the example embodiments of the present invention and their advantages have been described in detail, it should be understood that various changes, substitutions and alterations may be made herein without departing from the scope of the invention.

The invention claimed is:

1. A patch-based texture filtering method for removing texture from an image, comprising:
   determining a structural edge in respective patches for respective pixels of an input image; and
   performing patch shifting of the respective patches for respective pixels based on structural edge information of the respective patches, and selecting representative patches for the respective pixels; and
   after the selecting representative patches, generating a first guide image by using information on the representative patches and the input image.

2. The patch-based texture filtering method of claim 1, wherein the structural edge is determined based on a tonal range or modified relative total variation (mRTV) of pixel values of the respective patches for respective pixels.

3. The patch-based texture filtering method of claim 1,
   wherein the selecting representative patches includes selecting a neighboring patch or a reference patch having a minimum tonal range or a minimum mRTV as a representative patch for each pixel,
   wherein, when the reference patch is a patch in which a first pixel is disposed in a center thereof, the neighboring patch includes one of patches obtained by shifting the reference patch so that the first pixel is disposed around the center thereof, and
   wherein, when the reference patch is a patch in which the first pixel is disposed in a predetermined first position thereof, the neighboring patch includes one of patches obtained by shifting the reference patch so that the first pixel is disposed in a second position different from the predetermined first position.

4. The patch-based texture filtering method of claim 3, wherein the selecting representative patches includes: when a plurality of patches including the reference patch having a minimum tonal range or minimum mRTV exist, selecting the reference patch as the representative patch.

5. The patch-based texture filtering method of claim 1, further comprising, before the generating the first guide image, smoothing the input image.

6. The patch-based texture filtering method of claim 1, further comprising, after the generating the first guide image, generating a second guide image by using the first guide image and a smoothed input image, and performing joint bilateral filtering by using the second guide image and the input image.

7. The patch-based texture filtering method of claim 6, further comprising repeatedly performing texture filtering by using a result image obtained through the joint bilateral filtering as a new input image.

8. The patch-based texture filtering method of claim 6, wherein the second guide image is generated based on Equation 3, $$G_p = \alpha_p G_p^0 + (1-\alpha_p) B_p \quad \text{[Equation 3]}$$

wherein $G_p$ represents the second guide image, $B_p$ represents pixel values of the smoothed input image, $G_p^0$ represents pixel values of the first guide image, and $G_p^0$ represents a degree of blending.

9. A non-transitory computer-readable recording medium storing a computer program for performing a patch-based texture filtering method according to claim 1.

10. A patch-based texture filtering apparatus for removing texture from an image, comprising:
    a determination unit configured to determine a structural edge in respective patches for respective pixels of an input image; and
    a selection unit configured to perform patch shifting of the respective patches for respective pixels based on structural edge information of the respective patches, and to select representative patches for the respective pixels,
    wherein the determination unit is configured to determine whether the respective patches for respective pixels of the input image include the structural edge based on a tonal range or modified relative total variation (mRTV) of pixel values of the respective patches for respective pixels.

11. The patch-based texture filtering apparatus of claim 10, wherein the selection unit is configured to select a neighboring patch or a reference patch having a minimum tonal range or minimum mRTV as a representative patch for each pixel,
    wherein, when the reference patch is a patch in which a first pixel is disposed in a center thereof, the neighboring patch includes one of patches obtained by shifting the reference patch so that the first pixel is disposed around the center thereof, and
    wherein, when the reference patch is a patch in which the first pixel is disposed in a predetermined first position thereof, the neighboring patch includes one of patches obtained by shifting the reference patch so that the first pixel is disposed in a second position different from the predetermined first position.

12. The patch-based texture filtering apparatus of claim 11, wherein the selection unit is configured to select the reference patch as the representative patch when a plurality of patches including the reference patch having a minimum tonal range or minimum mRTV exist.

13. The patch-based texture filtering apparatus of claim 10, further comprising:
    a first generation unit configured to generate a first guide image by using information on the representative patches and the input image; and
    a second generation unit configured to generate a second guide image by using the first guide image and the input image.

14. The patch-based texture filtering apparatus of claim 13, further comprising a smoothing unit configured to smooth the input image before the first generation unit generates the first guide image.

15. The patch-based texture filtering apparatus of claim 13, further comprising a joint bilateral filtering unit configured to perform joint bilateral filtering by using the second guide image and the input image.

16. The patch-based texture filtering apparatus of claim 15, further comprising a feedback unit configured to perform texture filtering repeatedly by using a result image obtained through the joint bilateral filtering as a new input image.

17. The patch-based texture filtering apparatus of claim 13, wherein the second generation unit is configured to generate the second guide image by adding a value obtained by multiplying pixel values of the first guide image and a degree of blending and a value obtained by multiplying pixel values of the smoothed input image and one's complement value of the degree of blending.

18. The patch-based texture filtering apparatus of claim 17, wherein the degree of blending is defined based on the mRTV determined by the determination unit configured to determine the structural edge in respective patches for respective pixels of the input image and the mRTV of the representative patches selected by the selection unit configured to select the representative patches for the respective pixels.

* * * * *